US008818569B2

(12) United States Patent
Oakes

(10) Patent No.: US 8,818,569 B2
(45) Date of Patent: Aug. 26, 2014

(54) VEHICLE COMMUNICATIONS AND ACCESS

(75) Inventor: Jonathan L Oakes, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 94 days.

(21) Appl. No.: 13/299,786

(22) Filed: Nov. 18, 2011

(65) Prior Publication Data
US 2013/0131894 A1 May 23, 2013

(51) Int. Cl.
G05D 3/00 (2006.01)
G06F 19/00 (2011.01)

(52) U.S. Cl.
USPC ............................................... 701/2

(58) Field of Classification Search
USPC ............................................... 701/2
See application file for complete search history.

(56) References Cited

U.S. PATENT DOCUMENTS

| RE32,914 E | 5/1989 | Almblad |
| 7,589,619 B2 * | 9/2009 | DeKeuster et al. ........... 340/442 |
| 7,629,875 B2 | 12/2009 | Baumgartner et al. |
| 7,725,129 B2 * | 5/2010 | Grunhold ................... 455/556.1 |
| 7,990,255 B2 | 8/2011 | Santavicca et al. |
| 2008/0164988 A1 * | 7/2008 | DeKeuster et al. ........... 340/442 |
| 2010/0102943 A1 | 4/2010 | Rutledge et al. |
| 2010/0198428 A1 * | 8/2010 | Sultan et al. ...................... 701/2 |
| 2010/0222939 A1 * | 9/2010 | Namburu et al. ................. 701/2 |
| 2010/0305779 A1 | 12/2010 | Hassan et al. |

OTHER PUBLICATIONS

Related U.S. Appl. No. 13/590,434, filed Aug. 21, 2012.

* cited by examiner

Primary Examiner — Mary Cheung
Assistant Examiner — Michael Berns

(57) ABSTRACT

A communications and access system for a vehicle includes a vehicle module including a microprocessor and a sensor device integrated within each tire of a vehicle. The sensor device includes a tire pressure monitoring sensor and an antenna communicatively coupled to the sensor device. The antenna is configured to receive tire pressure data from the sensor device and a wireless communication from a device external to the vehicle. The system also includes another antenna communicatively coupled to the vehicle module. The other antenna receives the tire pressure data and the wireless communication transmitted by the sensor device via the antenna coupled to the sensor device. The system further includes logic executable by the microprocessor. The logic is configured to identify sources of the tire pressure data and the wireless communication, and transmit instructions to a body control module of the vehicle. The instructions are configured to perform a corresponding function.

20 Claims, 2 Drawing Sheets

VEHICLE COMMUNICATIONS AND ACCESS

FIELD OF THE INVENTION

The subject invention relates to vehicle communications and, more particularly, to a single sensor array for tire pressure monitoring, passive entry, remote function actuation, and approach detection.

BACKGROUND

Currently, vehicles are manufactured to provide a plethora of control features. For example, electronic control units in a vehicle receive information from various vehicle electronics to control particular devices, such as power windows, power mirrors, power locks, air conditioning, etc. In addition, vehicles are often equipped with electronics and sensors that provide continuous information concerning the operational condition of the vehicle so that vehicle owners, armed with this knowledge, can make informed decisions about the safety, repair, and maintenance of their investment.

These systems, while useful, utilize a significant amount of electronic components and physical wiring. For example, tire pressure monitoring system (TPMS) sensors associated with a vehicle's tires broadcast the status of the tire pressure of each tire to a remote function receiver (RFR) module in the vehicle. The RFR module is physically coupled (either by a discrete wire or network bus) to a body control module which, in turn, communicates this status information to a vehicle operator when, e.g., tire pressure is low. The TPMS sensors can broadcast information but are not equipped to receive communications. In another example, passive entry passive start (PEPS) systems, which provide the ability for individuals to unlock the vehicle doors and start the vehicle without physically handling the vehicle's key fob, require that several ferrite core antennae per vehicle be situated in various locations in the vehicle, such as the front, middle, and rear end portions of the vehicle interior, as well as in the exterior door handles. The PEPS antennae allow for communication to and from external systems (e.g., key fob or smart phone). Each of the antennae is physically wired to a dedicated PEPS module.

It is desirable to provide a vehicle system that performs the functionality of the TPMS sensors, the passive entry passive start system, the remote function receiver, and other components using fewer electronic modules, antennae, and less physical wiring than are typically associated with such systems.

SUMMARY OF THE INVENTION

In one exemplary embodiment of the invention, a communications and access system for a vehicle is provided. The communications and access system includes a vehicle module including a microprocessor and a sensor device integrated within each tire of a vehicle. The sensor device includes a tire pressure monitoring sensor and a first antenna communicatively coupled to the sensor device. The first antenna is configured to receive tire pressure data from the sensor device and a wireless communication from a device external to the vehicle. The communications and access system also includes a second antenna communicatively coupled to the vehicle module. The second antenna is configured to receive the tire pressure data and the wireless communication transmitted by the sensor device via the first antenna coupled to the sensor device. The communications and access system further includes logic executable by the microprocessor. The logic is configured to identify sources of the tire pressure data and the wireless communication, and transmit instructions to a body control module of the vehicle. The instructions are configured to perform a corresponding function.

In another exemplary embodiment of the invention, a method for implementing a communications and access system for a vehicle is provided. The method includes obtaining tire pressure data by a sensor device via a tire pressure monitoring sensor of the sensor device and a first antenna communicatively coupled to the sensor device, the sensor device integrated within a tire of the vehicle. The method also includes receiving, via the first antenna of the sensor device, a wireless communication from a device external to the vehicle, and relaying the tire pressure data and the wireless communication from the first antenna to a second antenna, the second antenna communicatively coupled to a vehicle module, the vehicle module including a microprocessor. The method further includes identifying, via logic executable by the microprocessor, sources of the tire pressure data and the wireless communication, and transmitting, via the logic, instructions to a body control module of the vehicle, the instructions configured to perform a corresponding function.

In a further exemplary embodiment of the invention, a computer program product for implementing a communications and access system for a vehicle is provided. The computer program product includes a storage medium having instructions embodied thereon, which when executed by computer processors cause the computer processors to implement a method. The method includes obtaining tire pressure data by a sensor device via a tire pressure monitoring sensor of the sensor device and a first antenna communicatively coupled to the sensor device, the sensor device integrated within a tire of a vehicle. The method also includes receiving, via the first antenna of the sensor device, a wireless communication from a device external to the vehicle, and relaying the tire pressure data and the wireless communication from the first antenna to a second antenna, the second antenna communicatively coupled to a vehicle module. The method further includes identifying sources of the tire pressure data and the wireless communication, and transmitting instructions to a body control module of the vehicle, the instructions configured to perform a corresponding function.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
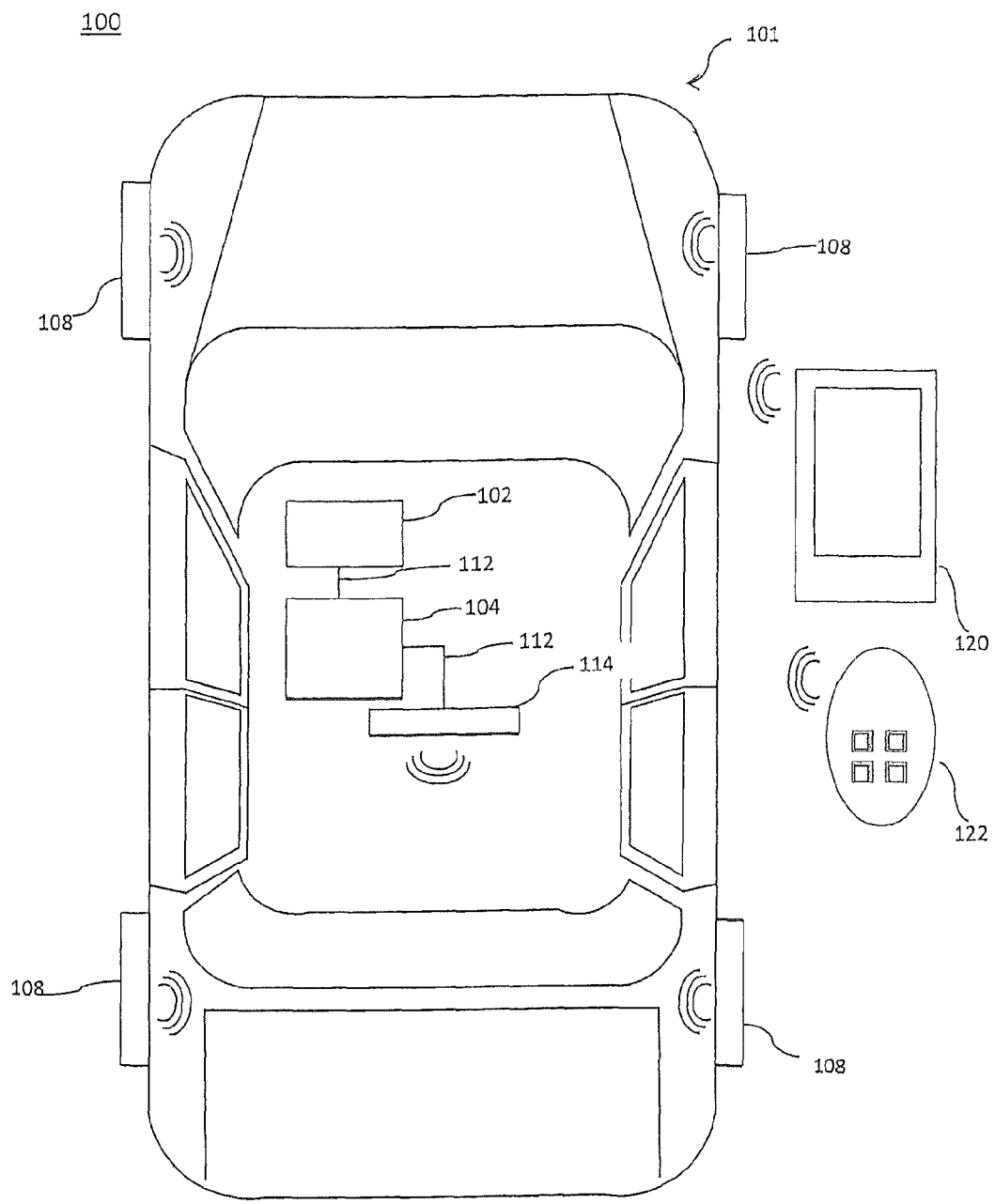
FIG. 1 is a plan view of a system for implementing vehicle communications and access in an embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, an enhanced vehicle communications and access system is provided. The vehicle communications and access system includes electronic components with enhanced communication capabilities utilizing a sensor array. In one embodiment, the vehicle communications and access system includes combined function sensor devices that broadcast and receive tire pressure information utilizing a prescribed wireless communication protocol, such as Bluetooth™. In addition, the combined function sensor devices are configured to sense the approach of wireless devices (e.g., Bluetooth™-enabled devices) and relay the information to a combined function module. The combined function sensor devices are also configured to listen for wireless remote function actuation requests, as will be described herein. The vehicle communications and access system includes the combined function module, which manages information received from the combined function sensor devices, as well as manages vehicle component systems, such as a passive entry passive start system, a remote actuation system, and an approach detection system.

Turning now to FIG. 1, a system 100 for implementing the vehicle communications and access features will now be described. The system 100 includes a vehicle 101 and wireless devices 120 and 122. The vehicle 101 may be any type of automobile, truck, utility vehicle, van, etc., known in the art. The wireless device 120 may be a cellular telephone or smart phone, and the wireless device 122 may be a key fob. The wireless devices 120 and 122 are configured with passive entry passive start capabilities, as well as remote function actuation capabilities.

As shown in FIG. 1, the vehicle 101 includes a body control module (BCM) 102 communicatively coupled to a combined function module 104 (also referred to herein as "vehicle module") via, e.g., a discrete wire or vehicle network 112. The combined function module 104 is communicatively coupled to an antenna 114 via, e.g., a discrete wire or vehicle network 112. The antenna 114 is a radio frequency antenna and is configured to communicate wirelessly using a pre-defined communication protocol, such as Bluetooth™. The body control module 102 includes a microprocessor and logic for managing the operation of various vehicle electronics, such as power windows and mirrors, power locks, and lighting systems.

Also included in the vehicle 101 are combined function sensor devices 108 in wireless communication with the combined function module 104 via the antenna 114. The combined function sensor devices 108 are inserted into each wheel of the vehicle 101. Each of the combined function sensor devices 108 includes a microprocessor, a tire pressure monitoring system (TPMS) sensor, and an antenna (e.g., a radio frequency antenna). The TPMS sensors monitor tire pressure, and the corresponding antennae broadcast tire pressure data to the combined function module 104 via the antenna 114. The combined function sensor device 108 antennae are configured to communicate wirelessly using a pre-defined communication protocol, such as Bluetooth™.

In an embodiment, the combined function module 104 also includes a microprocessor and logic. The logic is configured to perform, in cooperation with the body control module 102 and antenna 114, passive entry passive start system functions, remote function actuation activities (e.g., remote lock and unlock, remote start, power door activation, power tailgate/decklid activation, panic, and other functions), and approach detection activities (e.g., approach lighting, power door handles, power liftgate, etc.).

In an embodiment, the combined function module 104 receives communications from the wireless devices 120 and 122, as well as the combined function sensor devices 108 via the antennae 114. The source of a communication (e.g., a particular combined function sensor device 108 or wireless device 120, 122) may be determined by an identifier that is transmitted along with the signal data. For example, each vehicle tire sensor may have a unique identifier associated therewith, which is transmitted to the combined function module 104 along with the tire pressure data. Likewise, each of the wireless devices 120 and 122 include a unique identifier that is transmitted or relayed to the combined function module 104, such that the combined function module 104 is capable of distinguishing among communications received from different devices. The particular requested function is also transmitted within the signal.

As indicated above, the exemplary vehicle communications and access system eliminates the need for various electronics, modules, and physical wiring otherwise associated with a vehicle. The combined function module 104 performs the functionality of both a passive entry passive start module, as well as a remote function receiver module and approach detection components, thereby eliminating the need for distinct modules and associated physical wiring. Further, by configuring the combined function module 104 to communicate wirelessly with a combined function TPMS/PEPS/RFR system, a number of the physical wires used in conventional passive entry passive start systems are eliminated.

In operation, when an individual approaches the vehicle 101 with a wireless device (e.g., a Bluetooth™- and PEPS-enabled device, such as a cellular telephone 120 or a key fob 122), a combined function sensor device 108 antenna within range of the wireless device enables the wireless device to authenticate itself to the combined function module 104 via a wireless signal. Upon a successful authentication, the combined function module 104 in cooperation with the body control module 102 unlocks the appropriate vehicle door(s) for the individual.

In addition, the vehicle communications and access system includes the functionality to perform remote lock and unlock, remote start, power door activation, power tailgate/decklid activation, panic, and other functions that might be triggered using a cellular telephone 120 or key fob 122.

As indicated above, the vehicle communications and access system also includes the functionality to perform approach detection polling. In an embodiment, the antennae of the combined function sensor devices 108 periodically listen for an approaching wireless device (e.g., wireless device 120 or 122). When the wireless device 120 or 122 is determined to be within a certain range, it "wakes up" the combined function module 104. The combined function module 104 controls the activation approach detection enabled functionality, which may include such features as approach lighting, power door handles, power liftgate, etc.

Figure 2:
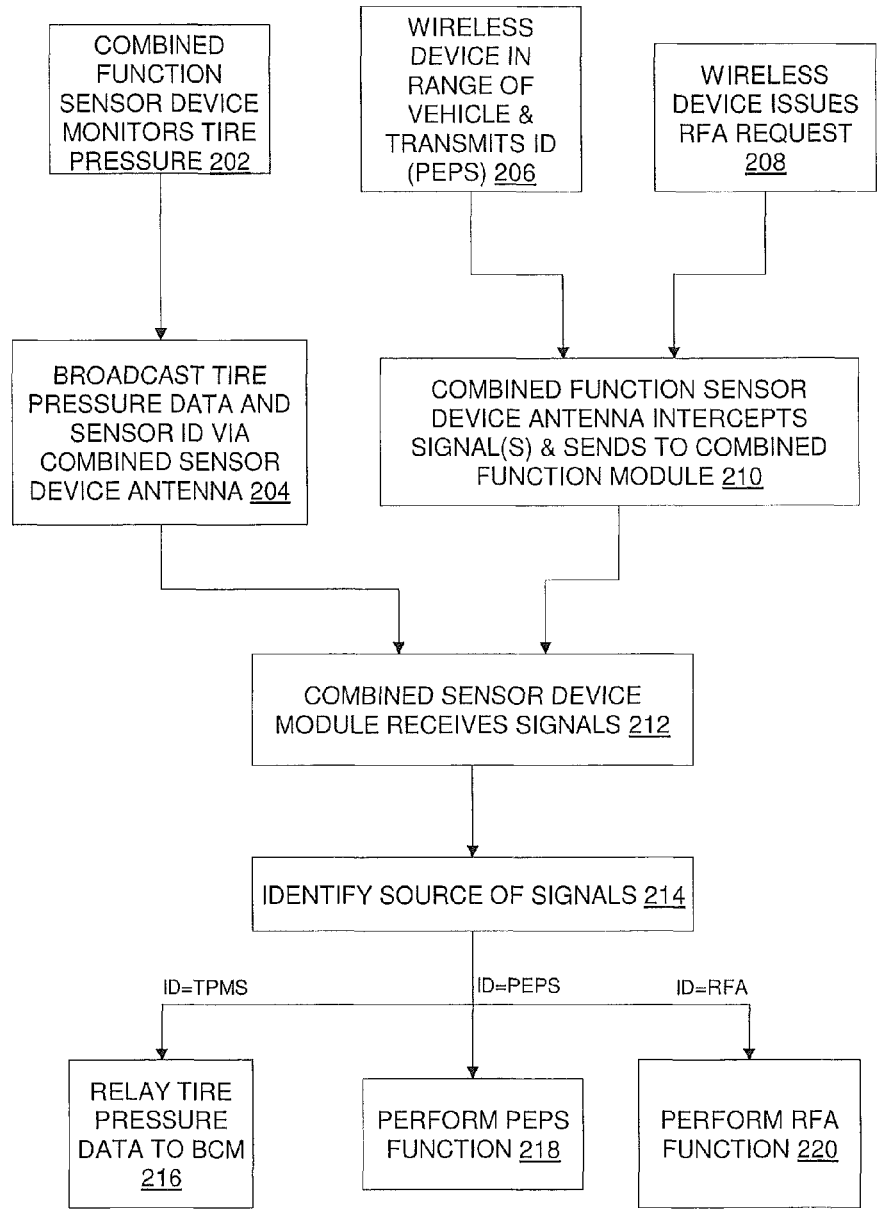
FIG. 2 is a flow diagram describing a process for implementing the vehicle communications and access in an embodiment of the invention.

Turning now to FIG. 2, a flow diagram describing a process for implementing the vehicle communications and access features will now be described in an embodiment. It will be understood that the sequence of signals transmitted by the various vehicle components may occur in any order, at any interval, and in any number. The sequence shown in FIG. 2 is provided for illustrative purposes and is not intended to be limiting in scope.

At step 202, the combined function sensor device 108 (e.g., from one or more of the vehicle tires) monitors the tire pressure, and at step 204, the corresponding combined function sensor device 108 antenna broadcasts a signal including an identifier of the sensor/tire and the tire pressure data obtained via the tire pressure sensor of the combined functions sensor device.

At step 206, a wireless device, such as a cellular telephone 120 or key fob 122 that is in communicative range of the vehicle transmits a signal including an identifier that identifies the wireless device. At step 208, an individual carrying a wireless device, such as the cellular telephone 120 or key fob 122 activates a component on the wireless device to initiate a function (e.g., power locking or unlocking, remote start, etc.) At step 210, one or more of the combined function sensor devices 108 receives the signal and relays the signal to the combined function module 104 through antenna 114.

At step 212, the combined function module 104 receives the signals from the combined function sensor device 108 and the wireless device and uses the identifier in the signals to identify their source (i.e., the combined function sensor device 108 or wireless devices 120 and 122) at step 214.

Based upon the identifier, the logic of the combined function module 104 is configured to implement one or more actions. For example, if the signal is from the combined function sensor device 108, the logic relays or transmits the signal, which includes the tire pressure data, to the body control module 102 at step 216. The body control module 102 may, in turn, provide the tire pressure data on a display of the vehicle 101 or by other means. Alternatively, if the signal is from the wireless device 120 or 122 and specifies a passive entry passive start request, the combined function module 104 logic sends a command to the body control module 102 to perform a PEPS function (e.g., unlocking the vehicle door(s)) (and optionally, starting the engine) or locking the door(s) as appropriate at step 218. Otherwise, if the signal is from the wireless device 120 or 122 and specifies a remote function actuation request, the combined function module 104 logic sends a command to the body control module 102 to perform the particular request (e.g., remote start, activate lights, etc.) at step 220.

Technical effects of the invention provide a combined function module including circuitry and a combined function sensor devices that perform various vehicle electronics control features utilizing fewer electronic components, modules, and physical wiring. The combined function module and combined function sensor devices communicate wirelessly between each other, as well as with external devices, such as a cellular telephone and key fob using defined wireless communication protocols.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A communications and access system for a vehicle, comprising:
    a vehicle module including a microprocessor;
    a vehicle module antenna communicatively coupled to the vehicle module;
    a sensor device integrated within each tire of a vehicle, the sensor device including a tire pressure monitoring sensor, and each sensor device within each tire is communicatively coupled to a corresponding antenna;
    an identifier uniquely identifying each corresponding antenna, each corresponding antenna configured to receive tire pressure data from the respective sensor device and a wireless communication from a device external to the vehicle;
    wherein the vehicle module antenna is configured to receive the tire pressure data, the identifier, and the wireless communication from the sensor device via the respective antenna; and
    logic executable by the microprocessor, the logic configured to identify the tire pressure monitoring sensor providing the wireless communication via the identifier, and transmit instructions to a body control module of the vehicle, the instructions configured to perform a function with respect to a component of the vehicle that is located relative to a location of the device.

2. The communications and access system of claim 1, wherein the wireless communication includes a request for a passive entry passive start function.

3. The communications and access system of claim 1, wherein the wireless communication includes a request for a remote function actuation.

4. The communications and access system of claim 3, wherein the remote function actuation includes at least one of:
    remote start of an engine of the vehicle; and
    activating lights on the vehicle.

5. The communications and access system of claim 1, wherein the wireless communication includes a request for an approach detection function.

6. The communications and access system of claim 1, wherein the wireless communication is received from a key fob and includes an identifier of the key fob.

7. The communications and access system of claim 1, wherein the wireless communication is received from a cellular telephone and includes an identifier of the cellular telephone.

8. A method for implementing a communications and access services, the method comprising:
    obtaining tire pressure data by a sensor device via a tire pressure monitoring sensor of the sensor device and an first antenna communicatively coupled to the sensor device, the sensor device integrated within a tire of a vehicle;
    receiving an identifier from the antenna, the identifier uniquely identifying the antenna with respect to the tire;

receiving, via the antenna of the sensor device, a wireless communication from a device external to the vehicle;

relaying the tire pressure data, the identifier of the antenna, and the wireless communication from the antenna to a vehicle module antenna that is communicatively coupled to a vehicle module, the vehicle module including a microprocessor;

identifying, via logic executable by the microprocessor, the tire pressure monitoring sensor providing the wireless communication via the identifier of the first antenna; and transmitting, via the logic, instructions to a body control module of the vehicle, the instructions configured to perform a function with respect to a component of the vehicle that is located relative to a location of the device.

9. The method of claim 8, wherein the wireless communication includes a request for a passive entry passive start function.

10. The method of claim 8, wherein the wireless communication includes a request for a remote function actuation.

11. The method of claim 10, wherein the remote function actuation includes at least one of:
   remote start of an engine of the vehicle; and
   activating lights on the vehicle.

12. The method of claim 8, wherein the wireless communication includes a request for an approach detection function.

13. The method of claim 8, wherein the wireless communication is received from a key fob and includes an identifier of the key fob.

14. The method of claim 8, wherein the wireless communication is received from a cellular telephone and includes an identifier of the cellular telephone.

15. A computer program product comprising a non-transitory storage medium having instructions embodied thereon, which when executed by computer processors cause the computer processors to implement a method, the method comprising:
   obtaining tire pressure data by a sensor device via a tire pressure monitoring sensor of the sensor device and an first antenna communicatively coupled to the sensor device, the sensor device integrated within a tire of a vehicle;
   receiving an identifier from the antenna, the identifier uniquely identifying the antenna with respect to the tire;
   receiving, via the first antenna of the sensor device, a wireless communication from a device external to the vehicle;
   relaying the tire pressure data, the identifier of the antenna, and the wireless communication from the antenna to a vehicle module antenna that is communicatively coupled to a vehicle module;
   identifying the tire pressure monitoring sensor providing the wireless communication via the identifier of the antenna; and
   transmitting instructions to a body control module of the vehicle, the instructions configured to perform a function with respect to a component of the vehicle that is located relative to a location of the device.

16. The computer program product of claim 15, wherein the wireless communication includes a request for a passive entry passive start function.

17. The computer program product of claim 15, wherein the wireless communication includes a request for a remote function actuation.

18. The computer program product of claim 17, wherein the remote function actuation includes at least one of:
   remote start of an engine of the vehicle; and
   activating lights on the vehicle.

19. The computer program product of claim 15, wherein the wireless communication includes a request for an approach detection function.

20. The computer program product of claim 15, wherein the wireless communication is received from at least one of a key fob and a cellular telephone and includes an identifier of the least one of the key fob and the cellular telephone.

* * * * *